Figure 1:
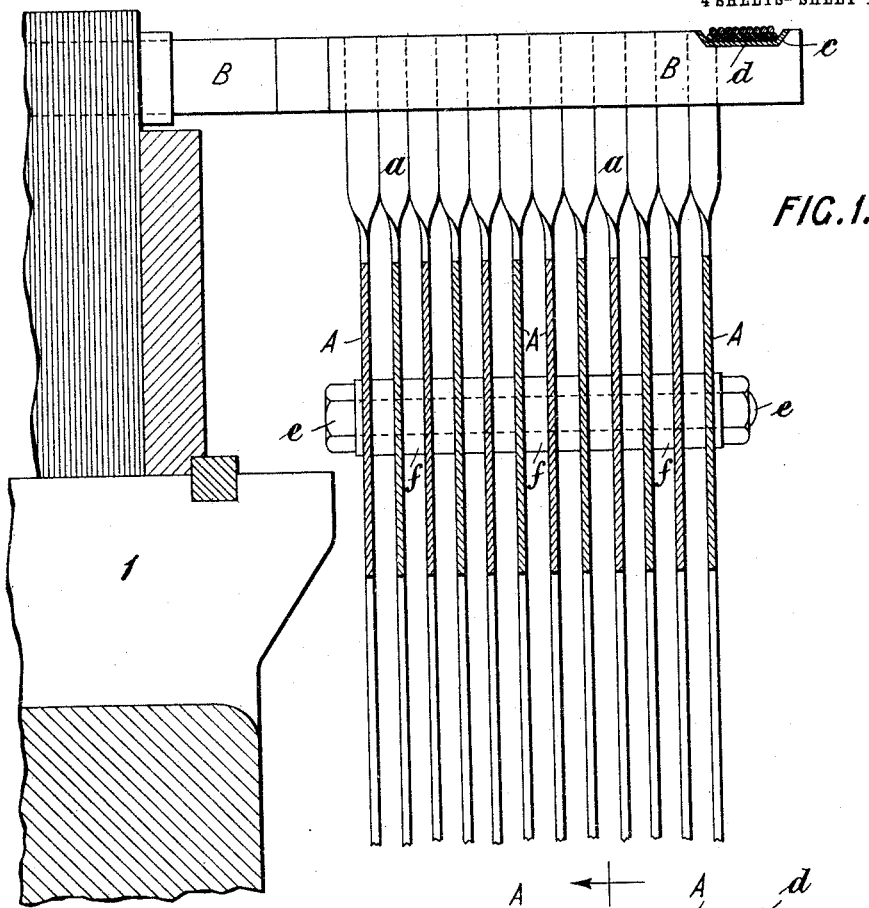

R. S. McLEOD.
ROTOR OF DYNAMO ELECTRIC MACHINES.
APPLICATION FILED JUNE 15, 1909.

965,925.

Patented Aug. 2, 1910.

4 SHEETS—SHEET 1.

Attest:
Ed. L. Tolson
Bent. M. Stahl

Inventor:
Robert Stafford McLeod,
By Shear Middleton Donaldson Shear
Attys.

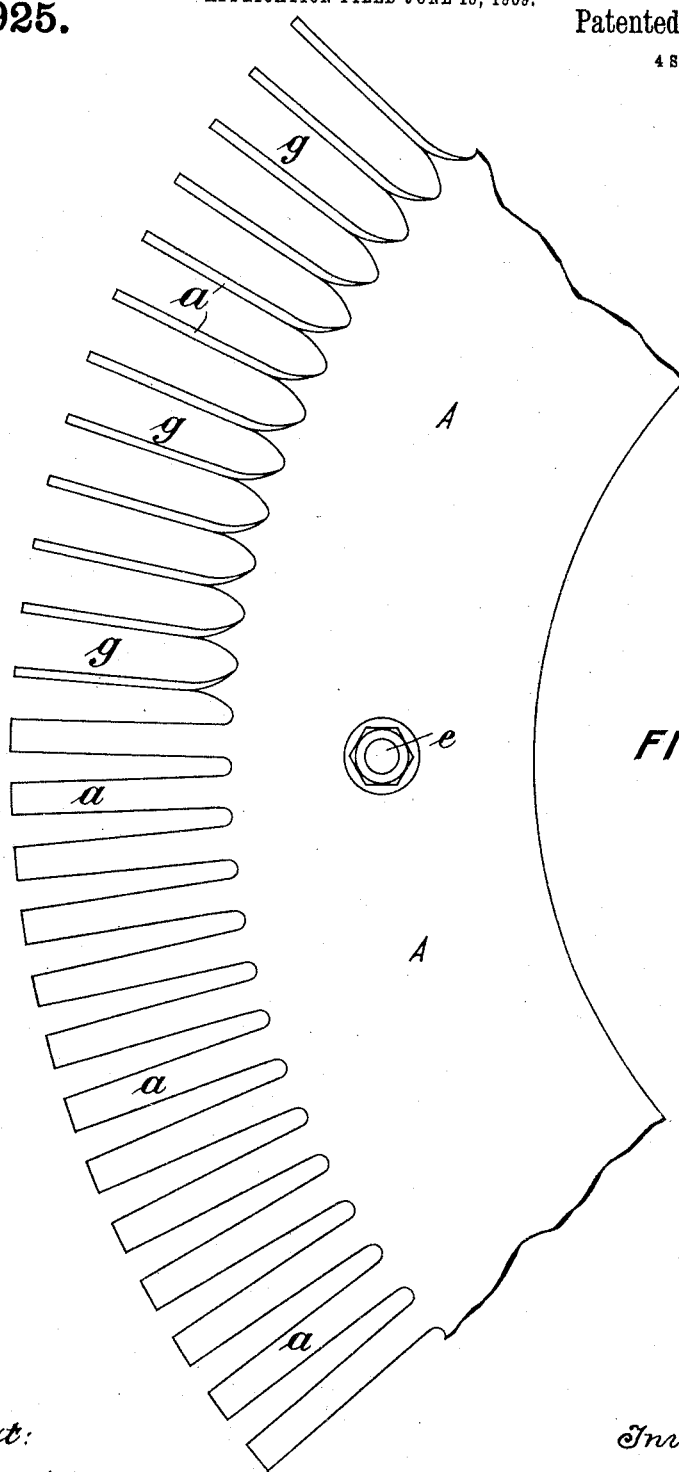

R. S. McLEOD.
ROTOR OF DYNAMO ELECTRIC MACHINES.
APPLICATION FILED JUNE 15, 1909.

965,925.

Patented Aug. 2, 1910.
4 SHEETS—SHEET 3.

Attest:
Edw. L. Tolson
Bent M. Stahl

Inventor:
Robert Stafford McLeod,
By Shaw Middleton Donaldson & Shaw
Attys.

R. S. McLEOD.
ROTOR OF DYNAMO ELECTRIC MACHINES.
APPLICATION FILED JUNE 15, 1909.

965,925.

Patented Aug. 2, 1910.
4 SHEETS—SHEET 4.

Attest:
Ed. L. Tolson.
Bent M. Stahl.

Inventor:
Robert Stafford McLeod.
By Spear Middleton Donaldson Spear
Attys.

THE NORRIS PETERS CO., WASHINGTON, D. C.

UNITED STATES PATENT OFFICE.

ROBERT STAFFORD McLEOD, OF DIDSBURY, NEAR MANCHESTER, ENGLAND.

ROTOR OF DYNAMO-ELECTRIC MACHINES.

965,925.  Specification of Letters Patent.  Patented Aug. 2, 1910.

Application filed June 15, 1909.  Serial No. 502,344.

*To all whom it may concern:*

Be it known that I, ROBERT STAFFORD MC-LEOD, a subject of the King of Great Britain, and residing in Didsbury, near Manchester, England, have invented certain new and useful Improvements in the Rotors of Dynamo-Electric Machines, of which the following is a specification.

This invention relates to the end rings used to connect together the conductors of short circuited rotors, such as are employed in induction motors and the like.

When the conductors of such rotors are connected together by a single end ring the latter has to carry the aggregate of the currents flowing in the bars and when this aggregate is considerable the heat generated makes it difficult to maintain good contacts; this heating may be minimized by increasing the number of end rings as for example in the well known Edison form of end connections in which a plurality of rings were used; in the case of short-circuited rotors each bar may be connected to each ring by attaching the bars to teeth formed on the peripheries of the rings, and the present invention has reference more particularly to the arrangement of such lugs and to the mode of their connection to the bars.

In known constructions the connection between the rings and the conductor bars has been made by providing a series of holes in the rings corresponding with the number of bars, and then threading the rings on the bars, suitable distance pieces or ferrules being provided on the bars between the rings; the connection between the bars and the rings is made by soldering or brazing the rings, the distance pieces and the bars together; in order to obviate the necessity for distance pieces it has been proposed to indent the holes in the rings through which the conductors pass, so as to form a flange which gives more area for attachment of the bar to the ring and at the same time forms the distance piece.

The object of the present invention is to improve the mode of attachment of the end rings to the conductors so as to simplify and cheapen the construction, and insure more perfect contact and considerable mechanical strength and at the same time to so shape the lugs or portions of the rings which are connected to the bars that they form blades the rotation of which induces air currents which impinge on the connections and keep them cool.

The invention is illustrated in the accompanying drawings, in which—

Figure 2:
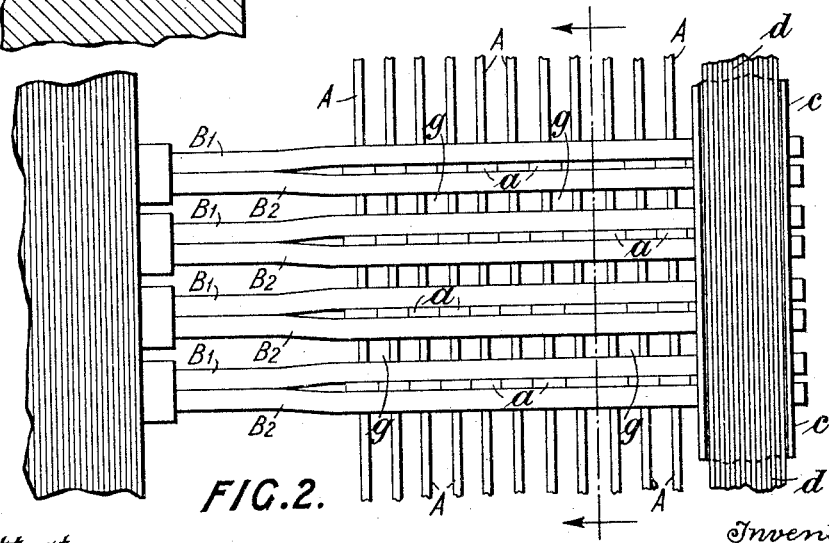
Figure 8:
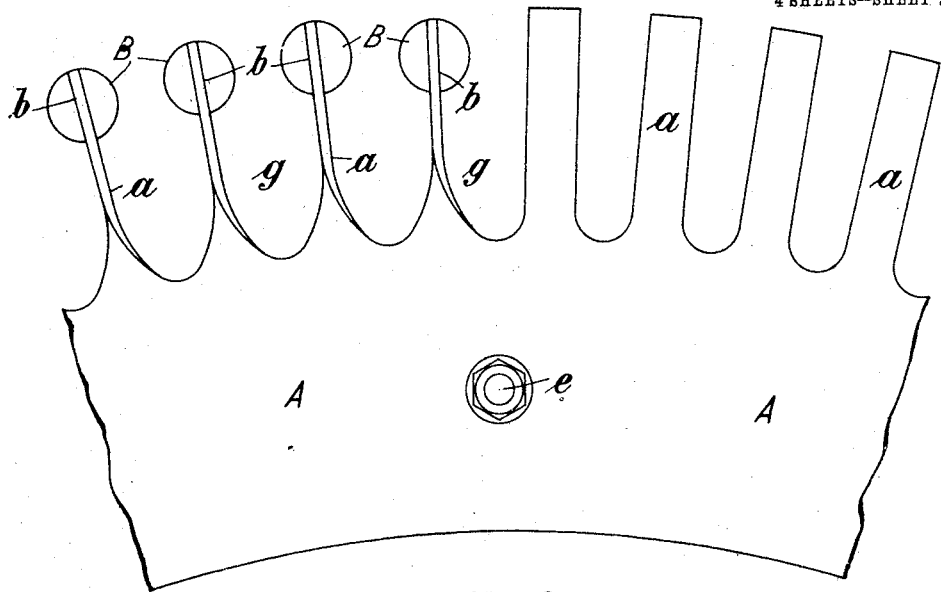
Figures 4, 5:
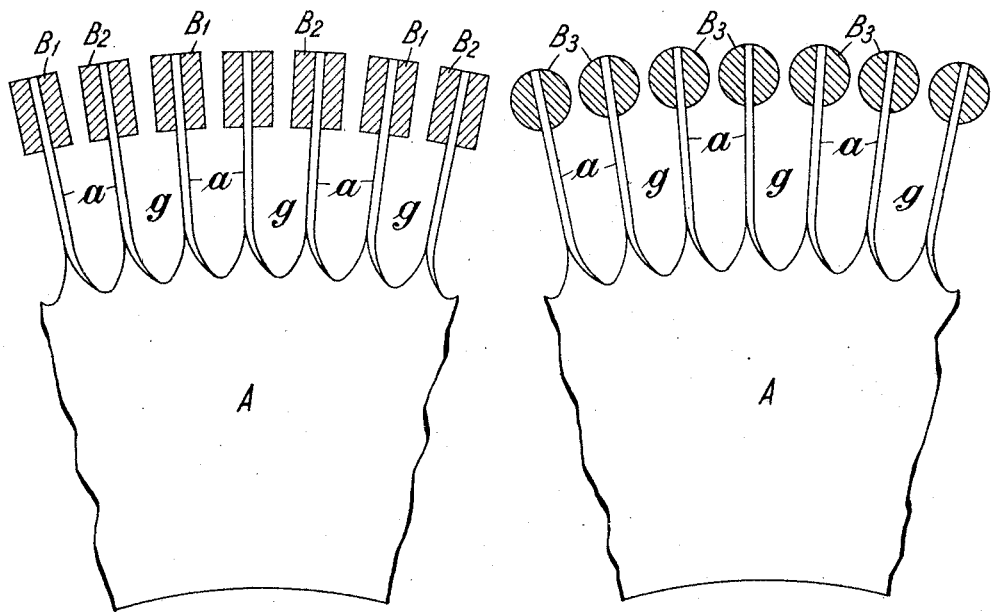
Figure 6:
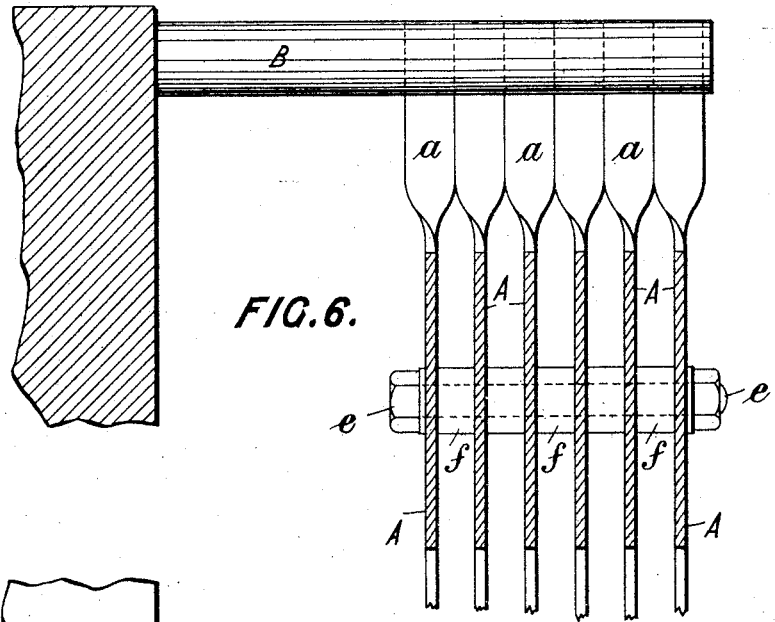
Figure 7:
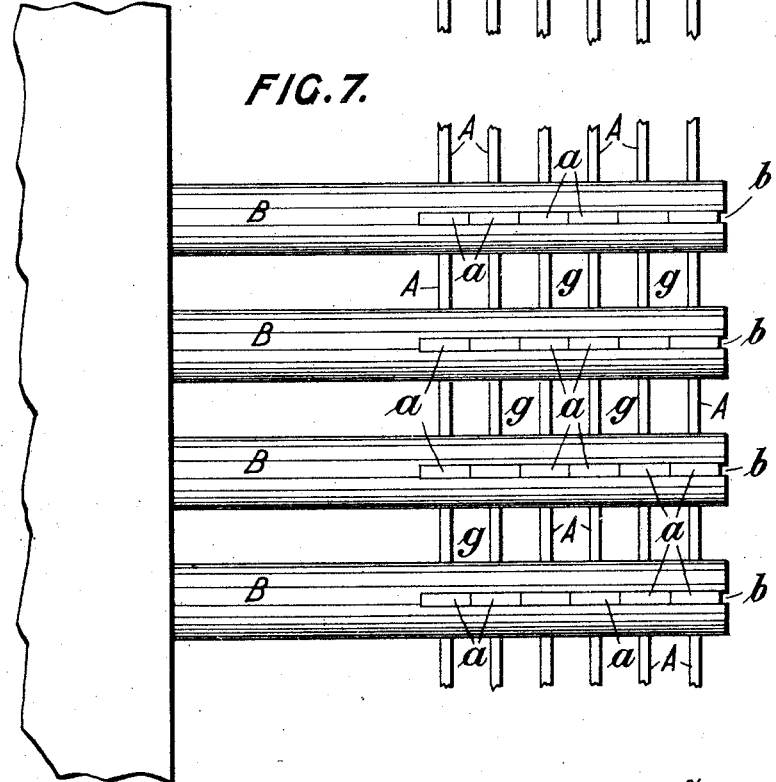

Figure 1 is an elevation in medial section, of the end of a rotor; Fig. 2 is a part plan; Fig. 3 is an end elevation showing a portion of one of the rings, some of the lugs being shown as shaped in the first instance, and some after being twisted as described. Fig. 4 is a fragmentary end elevation, and Fig. 5 is a view similar to Fig. 4 in which bars of semi-circular section are shown. Figs. 6, 7 and 8 are views analogous to Figs. 1, 2 and 3, and show the arrangement when the bars are provided with a saw-cut to take the lugs.

The construction of the rotor core, and the mode of insulating the bars, are not described, as these features form no part of my invention, and may be of the usual or any convenient construction.

According to the present invention, the end rings A are made with a central concentric opening considerably larger in diameter than the rotor shaft, and the outer portion of each is notched, so as to form a number of deep, radially disposed teeth or lugs $a$ of uniform width corresponding in number with the rotor bars which have to be connected together. Each of these lugs $a$ is twisted near the root so that the plane of the lug is at right angles to the plane of the ring.

Each conductor bar B of the rotor may have a radially disposed saw-cut $b$ (see Figs. 6, 7 and 8) of width equal to the thickness of the end ring. A sufficient number of the rings A are assembled together and the lugs $a$ are fitted in the said saw-cuts, their edges abutting together and serving to space the rings apart by a distance equal to the width of the lugs. When the rings are thus assembled, the lugs of the several rings form radially disposed plane surfaces of considerable length. The lugs are attached to the conductor bars by soldering or brazing, their ends being if necessary riveted over the conductor bars; in some cases rivets may be fitted passing through the several lugs and the conductor bar; or, instead of providing a single conductor bar with a slot, the conductor bar may be made in two parts B¹, B², (see Figs. 1, 2 and 4) which embrace the twisted lugs; and in some cases the section of each of the two parts B³ may be semi-circular (see Fig. 5), so that the two parts in the core form an approximately circular bar.

Where the peripheral speed is exceptionally high, the conductor bars may project beyond the end rings and be grooved as shown at c Fig. 1 to take steel banding wires d to prevent their radial displacement.

The end rings may be further secured together by bolts e threaded through distance pieces f located between the several rings.

The rings are usually made of copper, but where the rotor requires to have some resistance in the connecting parts, they may of course be made of suitable resistance metal.

It will be seen that there is a space between each pair of end rings, and that at the peripheries these spaces lead to a number of radial ducts g each of which is common to all the spaces; when the twisted parts of the lugs are assembled as described each set forms a radial plane extending across all the rings and these act after the well known manner of a centrifugal fan to induce currents of air from the center up between the rings and out through the said radial ducts, the air passing over the connections between the rings and the rotor conductor bars and serving to keep these latter cool.

Considerable advantage results from the fact that, with the construction described, the paths taken by the short circuited currents through the lugs to the conductor bars are more evenly distributed through the rings than would be the case with the ordinary construction.

Having now fully described my invention, what I claim, and desire to secure by Letters Patent is:—

1. In an induction motor in combination;— the conductor bars, a plurality of end connectors each consisting of a ring provided with a series of lugs, each of said lugs being twisted so that its plane is at right angles to the plane of the ring, the adjacent lugs of the several rings being attached to the corresponding conductor bar, and said twisted lugs serving to space the rings apart and to form radially disposed air vanes extending across the rings; substantially as described.

2. In an induction motor in combination;— the conductor bars having channels therein, a plurality of end connectors each consisting of a ring provided with a series of lugs, each of said lugs being twisted so that its plane is at right angles to the plane of the ring, the adjacent lugs of the several rings being attached to the corresponding conductor bar by fitting into the channels in the bars; substantially as described.

3. An induction motor comprising conductor bars each consisting of two parts separated at the ends, a plurality of end connectors each consisting of a ring provided with a series of lugs, each of said lugs being twisted so that its plane is at right angles to the plane of the ring, the adjacent lugs of the several rings being held between the two parts of the corresponding conductor bar.

In testimony whereof I have hereunto set my hand in the presence of two subscribing witnesses.

ROBERT STAFFORD McLEOD.

Witnesses:
JAMES CLARKE,
HUGH LLOYD DAVIES.